Aug. 5, 1958  C. O. BRODERS  2,845,938
BLEED GOVERNOR
Filed May 28, 1956  4 Sheets-Sheet 1
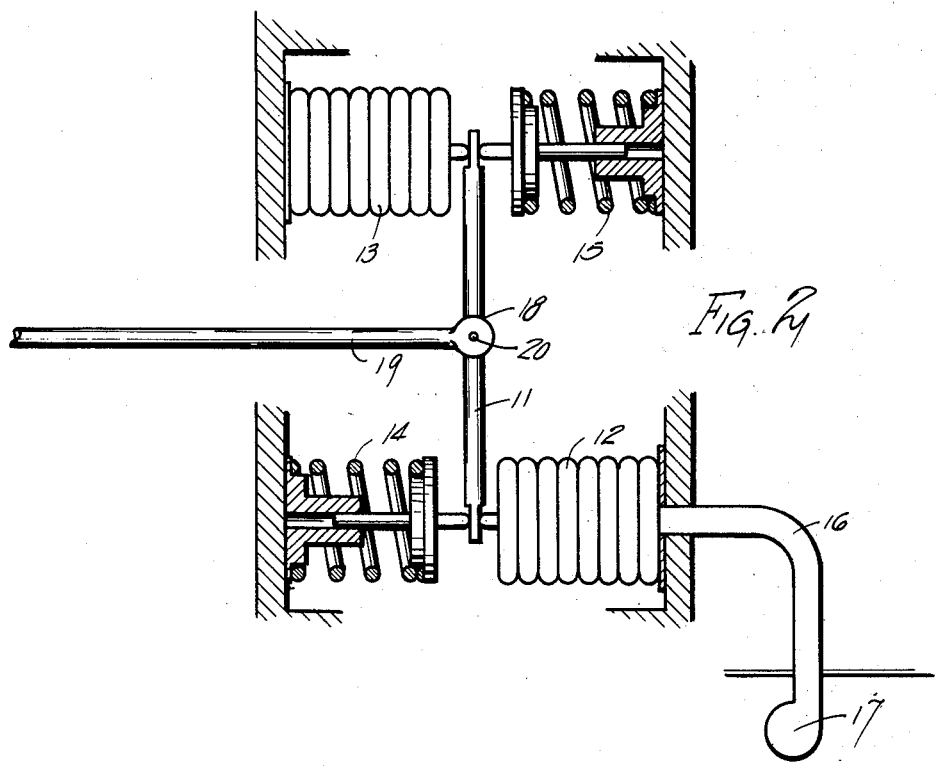
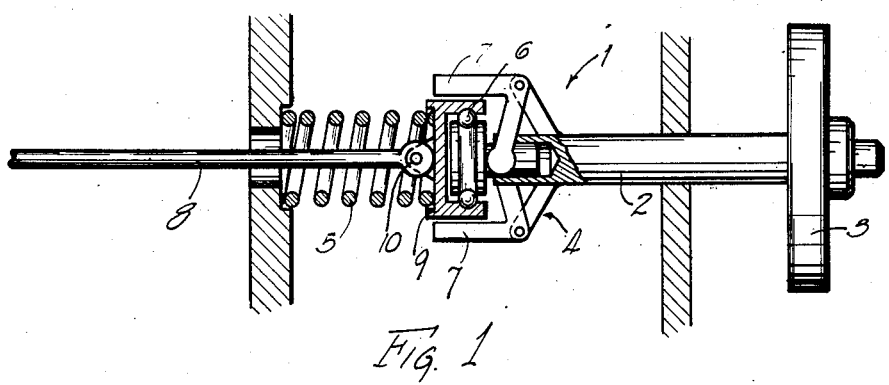
INVENTOR.
CLAUDE O. BRODERS
BY
ATTORNEYS Aug. 5, 1958     C. O. BRODERS     2,845,938
BLEED GOVERNOR
Filed May 28, 1956     4 Sheets-Sheet 2
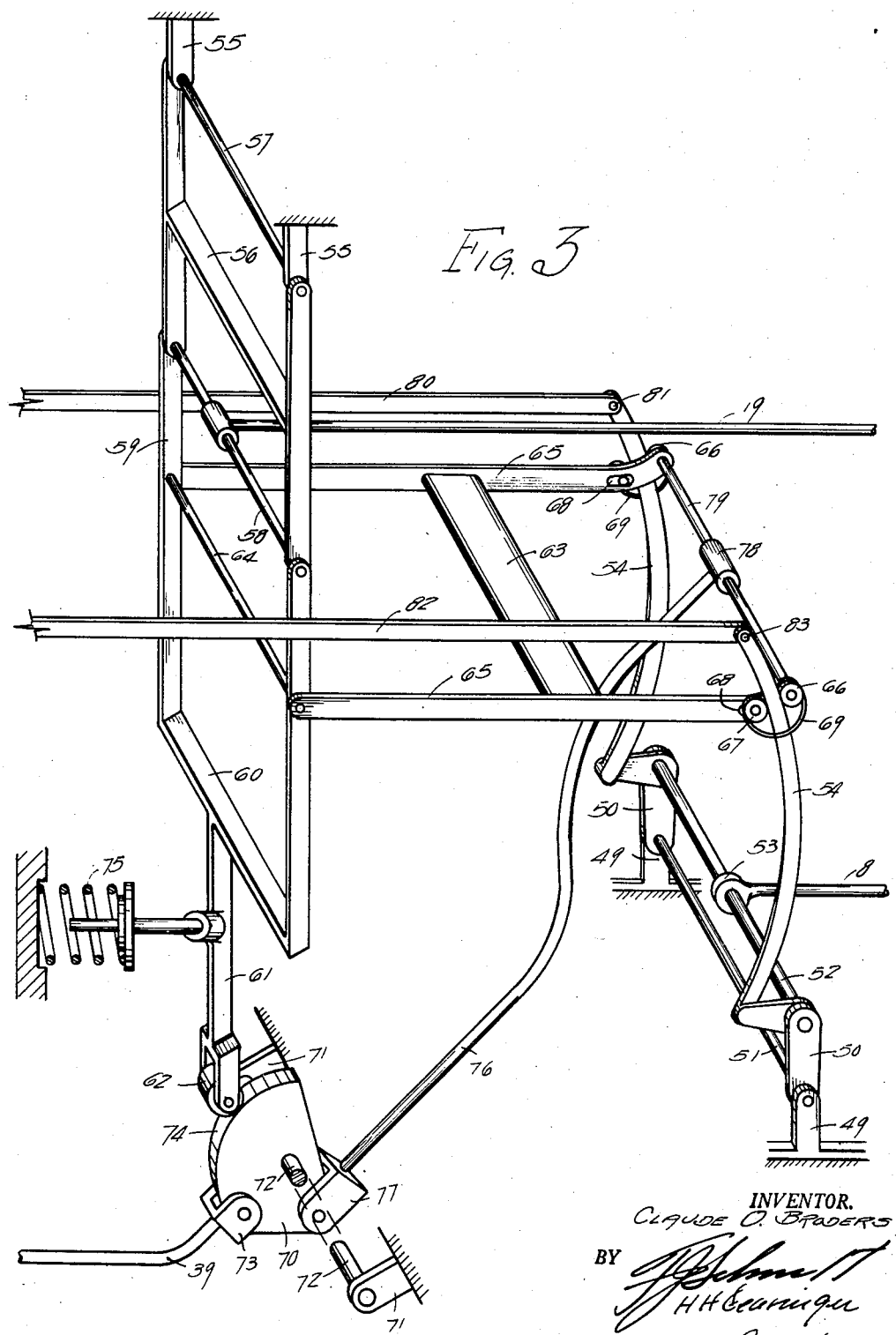
Fig. 3
INVENTOR.
CLAUDE O. BRODERS
ATTORNEYS Aug. 5, 1958  C. O. BRODERS  2,845,938
BLEED GOVERNOR
Filed May 28, 1956  4 Sheets-Sheet 4

INVENTOR.
CLAUDE O. BRODERS
BY
H. H. Carringer
ATTORNEYS

United States Patent Office 2,845,938
Patented Aug. 5, 1958

2,845,938
BLEED GOVERNOR

Claude O. Broders, Simsbury, Conn., assignor, by mesne assignments, to the United States of America as represented by the Secretary of the Navy Application May 28, 1956, Serial No. 587,908

4 Claims. (Cl. 137—51)

This invention relates to an intercompressor bleed governor for jet engines.

On certain types of jet engines, the bleed governor controls the actuators that open and close the intercompressor bleed valves. In this invention, this governor controls to a speed schedule with compressor inlet temperature and pressure biases. The two bleed valves operate in succession giving a "two step" operation with about 500 R. P. M. difference between their operating points. The speed to which this relates is that of the low pressure rotor of the engine. This invention controls the bleed valves to be open in the low speed range and closed in the high speed range of engine operation.

Under the present system of bleed governors, the bleed valves vary as a function of speed and temperature bias. By the addition of a pressure bias and the use of ball type pilot valves, the bleed valves are more closely regulated to the engine requirements. This provides for protection against compressor surge under all conditions and allows "bleeds closed" operation whenever possible for best performance and economy.

The instant invention provides a novel mechanical linkage that is responsive to speed, temperature and pressure signal inputs and controls the opening and closing of the bleed valves as a function of the signal inputs. The speed signal is produced by a flyball governor working against a calibrated spring. A sensing and a compensating bellows combine with a bulb to produce the temperature signal. The pressure signal is the result of the co-action of an evacuated bellows and a power bellows. These independent signals are then combined by a novel mechanical linkage to produce a representative signal that operates to open and close pilot valves controlling the bleed valves.

It is an object of this invention to have a bleed governor responsive to a function of speed, temperature and pressure bias.

It is a further object of this invention to provide a ball type pilot valve for operating the bleed valves.

Other objects and many of the attendant advantages of this invention will be readily appreciated as the same becomes better understood by reference to the following detailed description when considered in connection with the accompanying drawings wherein:

Figure 1 is a view showing the means for producing the speed signal.

Figure 2 shows the apparatus for producing the temperature signal.

Figure 3 shows the apparatus for combining the speed, temperature and pressure signals.

Figure 4:
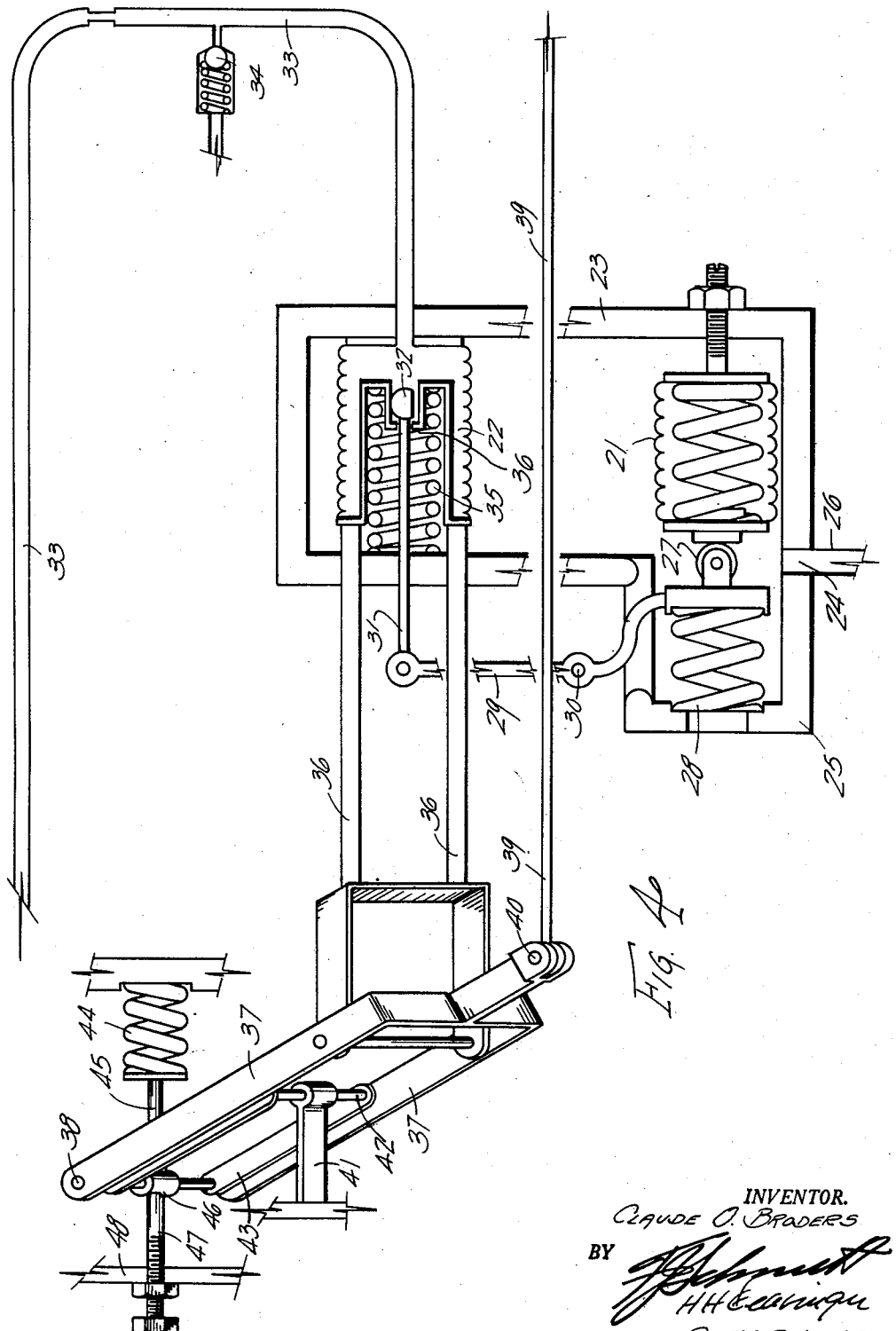
Figure 4 shows the apparatus for producing the pressure signal.

Referring to the drawings and in more particular to Figure 1, there is disclosed a means for supplying the speed signal indicated generally as 1. A drive shaft 2 is geared at one end 3 for rotation dependent upon the speed of the low pressure rotor. At the other end of the shaft a flyball governor 4 acting against a calibrated spring 5 produces a signal. A ball bearing 6 transmits the load from the rotating flyweights 7 to the stationary spring. The signal thus produced is transmitted to the rod 8 through the base 9 and the ball bearing 6. The rod 8 is pivotally connected to the base 9 at 10.

The temperature signal is produced by the apparatus disclosed in Figure 2 that allows a signal that is a function of inlet temperature only to be produced. A lever 11 is positioned at its ends by two liquid filled bellows 12 and 13 and opposing springs 14 and 15. The sensing bellows 12 is connected by a capillary tube 16 to a temperature sensing bulb 17 in the inlet air stream. Any changes in atmospheric conditions that would cause the sensing bellows to expand or contract is compensated for by the similar expansion or contraction of the compensating bellows 13. By this action the position of the center of the lever 11 is not changed due to atmospheric conditions. The temperature sensing bulb 17 is acted on by the inlet temperature to cause an additional contraction or expansion of the sensing bellows 12. Since the compensating bellows 13 is not connected to the sensing bulb 17, the center 18 of the lever 11 is moved. Movement of the center of the lever is transmitted to the rod 19 which is connected to the lever at the center by the pivot 20.

In Figure 4, there is disclosed a system for producing a signal varying as a function of the compressor pressure. This pressure signal is produced by an evacuated bellows 21 and a power bellows 22. A hollow housing 23 has an opening 24 in its base wall 25 to receive a tube 26 connected to supply the compressor pressure to the housing. A follower 27 is urged against the evacuated bellows 21 by the spring 28. The follower 27 is at one end of the lever 29 which is pivotally mounted on the outer wall of the housing at 30. The evacuated bellows 21 and the spring 28 produce a motion that is linear with compressor inlet pressure. This motion is transmitted through levers 29 and 31 to the valve 32. Pressure air from a high pressure source is admitted to the inside of the power bellows 22 through a tube 33. A pressure relief valve 34 bleeds off excessive high pressure. A spring 35 acting between the side wall of the housing and the power bellows loads the power bellows to the right as viewed in Figure 4. The power bellows takes the position where the pressure inside the bellows, created by the pressure air flowing into the bellows and then out through the opening between the valve 32 and its seat 36, is sufficient to balance the external spring 35 force. The opening between the valve 32 and its seat varies as a function of the evacuated bellows 21 to cause motion of the power bellows 22. The motion of the power bellows is transmitted by the rods 36 to the lever 37 which is pivotally mounted on the pivot pin 38 and from the lever 37 to the rod 39 pivotally mounted on the lever at 40.

Means are provided for adjusting the position of the pivot pin 38 providing for a zero adjustment of the pressure signal. A fixed base member 41 rotatably supports a shaft 42 carrying lever arms 43, which are fixedly secured to the pivot pin 38. A fixed spring 44 secured to the pivot pin 38 by a rod 45 urges a boss 46 on the pivot pin against an adjustable stop 47. Adjustment of the stop 47 by its threaded connection to a fixed support 48 varies the position of the pivot pin 38.

In Figure 3 there is disclosed a mechanism for combining the speed, temperature and pressure signals into one resultant output signal. A pair of lugs 49 fixed in position pivotally support one end of a pair of levers 50 on a pin 51 connecting the lugs. At the other end, the levers 50 are joined by a rotatably mounted rod 52. The rod 52 is pivotally connected to the speed signal rod 8 at 53 so that movement of the rod 8 displaces rod 52. Pivotally connected to the rod 52 adjacent the levers 50 are a pair of cam lever arms 54 which are adjusted by the rod 8 acting through the rod 52.

Another pair of lugs 55 are secured in position. An H-shaped member 56 is pivotally connected to the lugs 55 by the pin 57. The member 54 is actuated by the temperature signal rod 19 which is pivotally connected to a rod 58 joining the lower ends of the H-shaped mmeber 56. Pivotally connected to the rod 58 is a U-shaped member 59. Depending from the base 60 of the U-shaped member is a fork 61 carrying a roller 62. Another H-shaped member 63 is pivotally mounted at one end on the legs of the U-shaped member by a rod 64. At the other end, each of the legs 65 of the H-shaped member 63 has a pair of rollers 66 and 67 riding on the cam lever arms 54. The rollers 66 are fixed while the rollers 67 operate in slots 68 in the legs 65 and are urged toward the rollers 66 by springs 69. Thus, movement of the temperature signal rod 19 is transmitted through linkage 55—69 to also actuate cam lever arms 54.

A cam 70 is rotatably mounted in a pair of fixed lugs 71 by a pin 72. The pressure signal rod 39 is pivotally connected to the cam 70 at the fork member 73. The roller 62 is urged against the outer face 74 of the cam 70 by a spring 75 acting against the fork arm 61. A control rod 76 is pivotally connected at one end 77 to the cam 70 and at the other end 78 to a rod 79 extending between and carrying the rollers 66. Thus, cam lever arms 54 are adjusted by the pressure signal rod 39 through linkage 70—79.

A control lever 80 leading to the low speed operating valve assembly is attached to one of the cam lever arms 54 by the pivot joint 81. Another control lever 82 leading to the high speed operating valve assembly is attached to the other cam lever arm 54 by the pivot joint 83. Thus, the speed, temperature and pressure signals act on the cam lever arms 54 to produce a signal which controls the pilot valves of the bleed governor.

In a jet engine operating in the range of 3,000 to 10,000 R. P. M., it is desirable to have the bleed valves close at approximately 4,500 R. P. M. In order to escape compressor surge, the bleed valves in this invention are designed to be opened and closed in succession with a difference of 500 R. P. M. between the low speed valves and the high speed valves. If as above, it is desirable to have the bleed valves closed above 4,500 R. P. M., the low speed valves would close at 4,000 R. P. M. and the high speed valves at 4,500 R. P. M.

Figure 5:
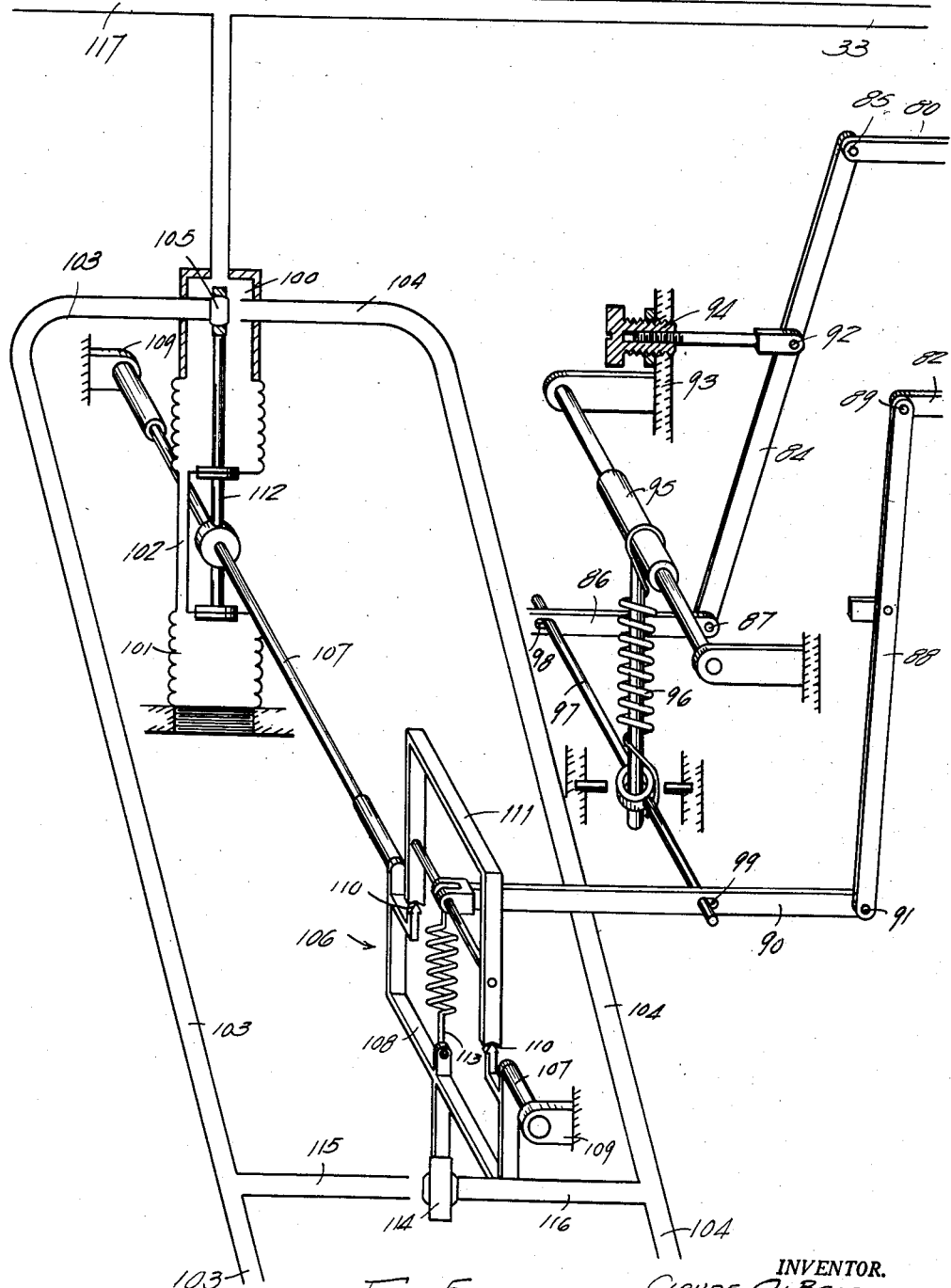
Figure 5 shows the apparatus for controlling the high speed bleed valve.

A pivotally mounted actuating lever 84 is operatively connected at one end to the low speed lever 80 by the pivot 85 and at its other end to a low speed pilot valve actuating lever 86 by the pivot 87. Another pivotally mounted actuating lever 88 is operatively connected to the high speed lever 82 by pivot 89 and at its other end to a high speed pilot valve actuating lever 90 by the pivot 91. The two step successive operation explained above is achieved by having adjustable pivot points for the actuating levers 84 and 88. In Figure 5, the lever 84 is pivotally mounted on the fork 92 which is adjustably mounted in a fixed support 93 by a threaded connection 94. A similar arrangement, not shown, is provided for lever 88. Thus, by adjusting the pivot points of the levers 84 and 88, the similar movement of the levers 80 and 82 is changed so that the lever 86 moves a greater distance than the lever 90.

The linkage systems are loaded, one against the other, to remove the back lash due to clearance in the pin joints by the rod 95 connected to torque spring 96 acting on the lever 97 which operates in slots 98 and 99 in the levers 86 and 90.

In Figure 5, there is also shown the operating mechanism for the high speed pilot valve assembly. The high pressure line 33 opens into a bellows 100 that is further connected to another bellows 101 by a capillary tube 102. A pressure transfer line 103 opening into the bellows 100 leads to a mechanism that closes the high speed bleed valve. Another pressure transfer line 104 opening into the bellows 100 leads to a mechanism that opens the high speed bleed valve. A pilot valve 105 operating between the openings of the transfer lines 103 and 104 in the bellows 100 determines into which transfer line the pressure is fed.

The position of the high speed pilot valve 105 is controlled by the lever 90 which operates a toggle arm switch, indicated generally at 106. A two sectioned shaft 107 joined by a U-shaped member 108 is rotatably supported on a pair of fixed studs 109. A pair of needle pivots 110 are mounted on the U-shaped member 108 and pivotally support a toggle arm 111. Fixed to the shaft 107 is a rod 112 to one end of which is secured the valve 105. As the toggle arm 111 moves past the center line position to the left, as viewed in Figure 5, the force of the tension spring 113 moves the valve shaft 107 clockwise. The rod 112 then moves the valve 105 from the position shown in Figure 5 to close the opening to pressure line 104. The pressure then flows through line 103 to close the high speed bleed valve. A valve 114 rigidly secured to the U-shaped member 108 moves simultaneously with the valve 105 to open and close line ports 115 and 116 to provide a limiting action. Sufficient flexibility of the bellows 100 and 101 allows for the pivotal action of rod 112. When the engine speed is retarded, the toggle arm 111 is pulled to the right, as viewed in Figure 5, by the lever 90 and the force of the tension spring moves the valve shaft counter-clockwise to move the valve 105 back to the high speed open position.

A similar pilot valve assembly, not shown, is provided for the low speed bleed valve. Lever 86 is operatively connected to the low speed pilot valve assembly which functions at a speed 500 R. P. M. lower than the high speed assembly.

In operation, the speed signal produced by the flyball assembly is transmitted by the rod 8 to move the lower ends of cam arms 54. The temperature signal produced by the bulb 17 moves the center of lever 18 which actuates the upper end of U-shaped member 59 to move the cam arms 54 through rollers 66. The pressure signal produced by power bellows 22 rotates the cam 70 to change the position of cam arms 54 by the action of rod 76 moving the rollers 66 and 67 along the cam tracks. Thus, the speed, temperature and pressure signals act on the cam arms 54 to produce a combined signal which is impressed on the levers 80 and 82.

As the speed of the engine reaches 4,000 R. P. M., the low pressure pilot valve assembly is moved to the low speed closed position. Pressure from the high pressure line 33 flows to the low speed bellows through pressure line 117 and then through the low speed closed lines to close the low speed bleed valves. When the engine speed reaches 4,500 R. P. M., the levers 82 and 90 actuate toggle arm 111 to move the high speed valve into the high speed closed position so that the high speed bleed valves will be closed.

Obviously many mondifications and variations of the present invention are possible in the light of the above teachings. It is therefore to be understood that within the scope of the appended claims the invention may be practiced otherwise than as specifically described.

What is claimed is:

1. In apparatus for bleeding intermediate stages of a jet engine compressor a device for combining independent speed, temperature and pressure signals said device comprising support means; an assembly pivotally mounted on said support means; means responsive to the speed of the compressor for controlling pivotal movement of the assembly on the support means; a pair of cam track elements integrally secured to the assembly; a U-shaped member also pivotally mounted on said support means; means responsive to a temperature signal from the compressor discharge air stream for controlling pivotal movement of the U-shaped member on the support means; a pair of levers, each said lever being pivotally connected at one end to the U-shaped element and connected at the other end for slideable movement along the cam track elements; a cam pivotally mounted on the support means; means responsive to a pressure signal from the compressor for controlling pivotal movement of the cam on the support means; means interconnecting the cam and the said pair of levers; and means connected to the cam track elements, the movement of said last named means being dependent upon speed, temperature, and pressure characteristics of the compressor.

2. The device as described in claim 1 wherein the control means responsive to the speed of the compressor comprises a rod element connected to the pivoted assembly; a calibrated spring; and a flyball governor acting against a calibrated spring to actuate the rod element.

3. The device as described in claim 1 wherein the control means responsive to the compressor temperature signal comprises a first bellows device controlled by the temperature of the surrounding atmosphere; a second bellows device controlled by the compressor temperature; an individual spring member opposing the action of each bellows device; a lever interconnecting the said bellows devices; and a rod interconnecting the said lever and the said U-shaped element.

4. The device as described in claim 1 wherein the control means responsive to the compressor pressure signal comprises a first bellows; means responsive to the compressor pressure signal for controlling movement of said first bellows; a fluid source; a second bellows; means connecting the fluid source and the second bellows; valve means controlled by movement of the first bellows for controlling escape of fluid from the said second bellows; and a lever interconnecting the said second bellows and the said cam.

References Cited in the file of this patent

UNITED STATES PATENTS

| | | |
|---|---|---|
| 1,527,275 | Ruths | Feb. 24, 1925 |
| 2,738,644 | Alford | Mar. 20, 1956 |
| 2,741,423 | Lombard | Apr. 10, 1956 |